(12) United States Patent
Blaber et al.

(10) Patent No.: US 9,717,217 B1
(45) Date of Patent: Aug. 1, 2017

(54) SMALL ANIMAL RESTRAINING HARNESS OR JACKET

(71) Applicant: The Florida State University Research Foundation, Inc., Tallahassee, FL (US)

(72) Inventors: Michael Blaber, Tallahassee, FL (US); Sachiko I. Blaber, Tallahassee, FL (US)

(73) Assignee: The Florida State University Research Foundation, Inc., Tallahassee, FL (US)

(*) Notice: Subject to any disclaimer, the term of this patent is extended or adjusted under 35 U.S.C. 154(b) by 175 days.

(21) Appl. No.: 14/926,312

(22) Filed: Oct. 29, 2015

Related U.S. Application Data

(63) Continuation-in-part of application No. 14/169,883, filed on Jan. 31, 2014, now abandoned.

(60) Provisional application No. 61/759,096, filed on Jan. 31, 2013.

(51) Int. Cl.
*A01K 13/00* (2006.01)

(52) U.S. Cl.
CPC .................. *A01K 13/006* (2013.01)

(58) Field of Classification Search
CPC ...... A01K 13/00; A01K 13/006; A01K 15/00; A01K 27/002
USPC ................. 119/725, 850, 853, 855
See application file for complete search history.

(56) References Cited

U.S. PATENT DOCUMENTS

| | | | |
|---|---|---|---|
| 4,489,676 A | 12/1984 | Colquist | |
| 4,491,089 A * | 1/1985 | Kelly | A01K 15/00 119/722 |
| 5,293,840 A | 3/1994 | Wedlick | |
| 5,839,393 A | 11/1998 | Rupp et al. | |
| 5,975,028 A | 11/1999 | Wetmore | |
| 6,443,101 B1 * | 9/2002 | Fazio | A01K 27/002 119/792 |
| 6,601,540 B1 * | 8/2003 | Davis | A01K 1/0263 119/771 |
| 7,387,088 B2 | 6/2008 | Sporn | |
| 2003/0177984 A1 * | 9/2003 | Newman | A01K 13/006 119/850 |
| 2010/0071709 A1 * | 3/2010 | Grissom | A41B 13/06 128/870 |
| 2010/0145281 A1 | 6/2010 | Denault et al. | |

(Continued)

*Primary Examiner* — Monica Williams
*Assistant Examiner* — Aaron Rodziwicz
(74) *Attorney, Agent, or Firm* — Nilay J. Choksi; Smith & Hopen, P.A.

(57) ABSTRACT

An animal restraining harness or jacket and a method of use thereof, for protecting the shoulder and upper abdomen when experimental/surgical procedures are performed and when the experimental/surgical sites must be protected from biting, scratching, and other unwanted contact. The jacket generally includes a shoulder region and collar extensions, where the shoulder region is connected to the collar extensions. The collar extensions are wrapped and secured around the collar or neck area of the animal, and the shoulder region is wrapped and secured around the shoulder and torso area of the animal. Preferably, the collar extensions and shoulder region are secured on the dorsal side of the animal, thus providing a dorsal gap therebetween. This harnesses the animal effectively and prevents escape from the restraining jacket.

20 Claims, 8 Drawing Sheets

(56) References Cited

U.S. PATENT DOCUMENTS

2013/0025542 A1\* 1/2013 Gutierrez ............. A01K 13/006
　　　　　　　　　　　　　　　　　　　　119/600

\* cited by examiner

SMALL ANIMAL RESTRAINING HARNESS OR JACKET

CROSS-REFERENCE TO RELATED APPLICATIONS

This nonprovisional application is a continuation-in-part of and claims priority to U.S. Nonprovisional patent application Ser. No. 14/169,883, entitled "Small Animal Restraining Harness or Jacket", filed Jan. 31, 2014, which claims priority to U.S. Provisional Patent Application No. 61/759,096, entitled "Improved Mouse Jacket", filed Jan. 31, 2013, both of which are incorporated herein by reference in their entireties.

BACKGROUND OF THE INVENTION

1. Field of the Invention

This invention relates, generally, to restraints for laboratory rodents. More specifically, it relates to an improved harness that secures a rodent (e.g., mouse) while protecting the shoulder and upper abdomen from scratches.

2. Brief Description of the Prior Art

There are several different routes of administration for test animals. One primary route of administration used is the transdermal route. A transdermal route requires a topical application onto the skin of a test animal to test both local effect and systemic effects when the substance diffuses through skin. Live animal test subjects can be resistant to topical application, which may result in a failed test or injury to the animal. As a result, dermal inserts and harnesses are used to assist in restraining the animal.

Figure 1:
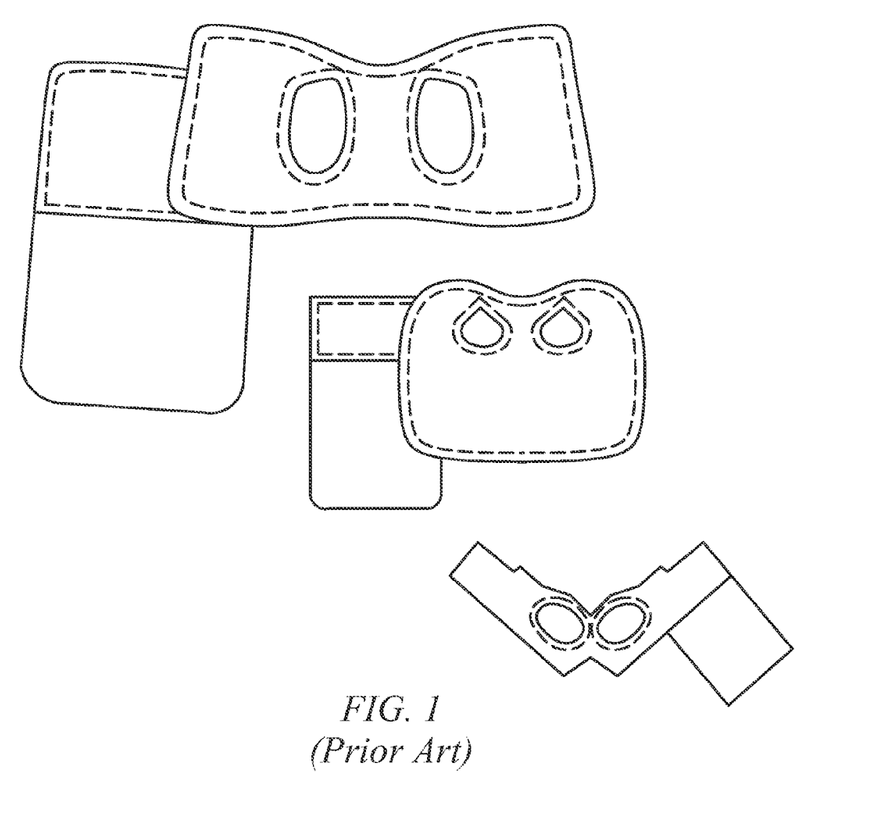
FIG. 1 depicts prior art jacket or restraint apparatuses for small animals.

One of the most common restraining device is substantially shown in the dermal applications inserts and harnesses sold by LOMIR BIOMEDICAL. As seen in FIG. 1, the LOMIR harnesses consist of a single wrap, VELCRO® strap, with two (2) apertures centrally located for feet placement. There are several different sizes of harnesses to accommodate animals of varying sizes from mice to rabbits. A LOMIR harness, and other harnesses like it, provide some protection of the application site by covering the area affected. Despite this advantage, the restraint suffers from several drawbacks. First, the restraint harness is easy for the animal to remove. The single, sock-like design allows the animal to easily slip out of the restraint. Mice typically exit such harnesses by working the harness over their head and exiting backwards out of the harness. Second, the restraint harness requires each foot of the animal to be placed within the apertures. This can be difficult depending on how resistant the animal is and the type of animal. Finally, the harnesses only cover a single area of the animal.

U.S. Pat. No. 5,839,393 to Rupp et al. discloses another restraint harness for animals. Rupp describes an animal restraint harness having a stretchable, elongated sheet with a pair of leg apertures located such that an animal's legs fit through when the device is fastened around the chest of the animal. An aperture is formed in the sheet midway between the leg apertures with a pair of elastic straps for receiving and holding a catheter. A flap is located along one side of the sheet for cover the aperture, elastic straps and any attached medical device. The Rupp apparatus provides several functional advantages over the prior art, but still suffers from some major draw backs. First, the Rupp device, like the restraint harness, is easy for the animal to remove. It still consists of a single sock-like covering that mice easily exit by pushing over their head and exiting backwards out of the harness. Second, the Rupp device can be expensive to manufacture and complicated to apply. Finally, the device only covers a single area of the animal.

U.S. Pat. No. 7,387,088 to Sporn discusses a harness used for smaller animals, such as dogs, that has a chest piece with attachments to shoulder straps and attachments to brisket straps. The brisket straps are capable of being attached to a leash for controlling the animal. On an even smaller scale, this apparatus would be entirely unsuitable for use on mice or other small animals for experimentation, as there are many moving parts and there is a high level of difficulty placing this apparatus on a subject or animal.

U.S. Pat. No. 5,293,840 to Wedlick discloses an animal restraining jacket that includes openings for the animal's neck, arms, and abdominal section. The animal is positioned through the abdominal opening of the jacket until the jacket properly surrounds the animal (e.g., arms and neck places through openings). A fastening mechanism, such as a zipper, is disposed on the abdominal opening and is closed to secure the animal in the jacket. This apparatus suffers from many of the setbacks previously discussed. For example, this apparatus would be difficult to place around the subject/animal, and the animal might be able to easily slip out by exiting backwards out of the harness.

U.S. Pat. No. 4,489,676 to Colquist discusses a canine cervical jacket having a fabric cover that is intended to be placed on the canine's back. The jacket further has two (2) apertures to receive the canine's front legs. This is very similar to the prior art previously discussed and has many similar drawbacks, including the fact that an apparatus such that this would be incapable of being applied to an experimental subject, such as a mouse.

Accordingly, what is needed is an improved rodent/mouse restraining harness, intended to protect shoulder and upper abdomen from scratching/biting. The device should be easily applied to an animal and be cheap to manufacture. Additional features should be incorporated to avoid easy removal by the animal. Finally, there is a need for a restraint harness that can cover two different areas of an animal simultaneously. Ideally such a device should be easy and cost-efficient to manufacture. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for an improved rodent harness is now met by a new, useful, and nonobvious invention.

In an embodiment, the current invention is a restraining harness or jacket for an animal (e.g., small animal, such as rodent/mouse). The jacket including an elongate shoulder region configured to wrap around a shoulder or torso area of the animal and at least one elongate collar extension coupled to the shoulder region and configured to wrap around a collar or neck area of the animal. A cleft is formed between the collar extension and shoulder region. The cleft includes a channel leading to a forelimb pocket configured to receive a forelimb of the animal. A channel gap is formed in the channel of the cleft, such that the channel opens up to the external environment (i.e., the channel is in open communication with the external environment) lateral to the jacket. A forelimb pocket gap is formed in the forelimb pocket.

The jacket may further include an indented notch formed in a superior edge of the jacket, where the notch would be adjacent to the collar extension and configured to conform to a throat area of the animal.

The inner edges of the shoulder region and collar extension may be disposed in substantially parallel relation to each other. In this case, the forelimb pocket gap may be larger than the channel gap, while still retaining the substantially parallel configuration.

The shoulder region may be thicker than the collar extension.

The shoulder region can have a length along its longitudinal axis, where half of this length is longer than a whole length of the collar extension.

The at least one collar extension may include two (2) collar extensions that extend in opposing directions from each other. In this case, there would be two (2) clefts formed, each between the shoulder region and respective collar extension. In a further embodiment, the collar extensions can be symmetrical about a central superior-inferior line of axis disposed transversely across the shoulder region on the superior-inferior axis (i.e., from the head of the animal to the rear).

The at least one collar extension may include two (2) collar extensions that each have an end that is configured to be fastened to the end of the opposing collar extension around the collar or neck area of the animal.

The jacket may an exterior surface formed of a resilient material and an interior surface formed of a flexible material, where the interior surface contacts the animal.

In a separate embodiment, the current invention is a restraining harness or jacket for an animal. The jacket includes an elongate shoulder region having two (2) opposing lateral edges that are configured to be fastened to each other around the shoulder or torso area of the animal. Two (2) collar extensions extend from a central area of the shoulder region in opposite directions. The ends of the collar extensions are configured to be fastened to one another around the collar of the animal. A cleft is formed between the shoulder region and each collar extension. Each cleft includes a channel leading to a forelimb pocket that is positioned to receive a forelimb of the animal.

The jacket may further include an indented notch formed in a superior edge of the jacket, where the notch would be positioned between the collar extensions and configured to conform to a throat area of the animal.

The inner edges of the shoulder region and each collar extension may be disposed in substantially parallel relation to each other. In this case, a channel gap may be formed within each channel of each cleft, and a forelimb pocket gap may be formed within the forelimb pocket of each cleft. The forelimb pocket gap may be larger than the channel gap, while still retaining the substantially parallel configuration.

The shoulder region may be thicker than the collar extension.

The collar extensions can be symmetrical about a central line of axis disposed transversely across the shoulder region along the central superior-inferior axis (i.e., from the head of the animal to the rear).

The jacket may an exterior surface formed of a resilient material and an interior surface formed of a flexible material, where the interior surface contacts the animal.

In a separate embodiment, the current invention is a restraining harness or jacket for an animal. The jacket includes an elongate shoulder region having lateral edges configured to be fastened to one another around the shoulder or torso area of the animal. The jacket further includes two (2) collar extensions extending from the central area of the shoulder region. The collar extensions extend in opposing directions from the shoulder region, where the ends of the collar extensions are configured to be fastened to each other around a collar of the animal. The inner edges of the collar extensions are substantially parallel to the inner edges of the shoulder region. The shoulder region has a size such that half of its length is longer than the lengths of each collar extension. The shoulder region is thicker than each of the collar extensions. A cleft is formed between the shoulder region and each collar extension, where each cleft includes a channel leading to a forelimb pocket that has a position that corresponds to a forelimb of the animal. A channel gap is formed within the channel of each cleft, and a forelimb pocket gap is formed within each forelimb pocket of each cleft. The forelimb pocket gap is larger than the channel gap. The collar extensions are symmetrical about a central superior-inferior line of axis disposed transversely across the shoulder region between the first and second collar extensions. An indented notch is formed in a superior edge of the jacket between the collar extensions, where the notch is configured to conform to a throat area of the animal. The jacket has an exterior surface formed of a resilient material and an interior surface formed of a flexible material, where the interior surface contacts the animal.

In a separate embodiment, the current invention is a method of harnessing or protecting a small animal (e.g., rodent) during an experimental procedure on the small animal. Alternatively, the current invention is a method for protecting a site of surgery on a small animal (e.g., rodent) during an experimental procedure on the small animal. In either case, any of the foregoing or following discussed embodiments of the restraining harness or jacket can be used. The restraining jacket is positioned in an open position on a ventral side of the animal. The shoulder region of the restraining jacket is wrapped and secured around the shoulder or torso area of the animal (if a site of surgery is to be protected, the shoulder region would be positioned over top the surgical/experimental site to prevent any unwanted contact there). The collar extension is wrapped and secured around the collar or neck area of the animal. An open dorsal gap is formed between the shoulder region and the collar extension on a dorsal side of the animal when the restraining jacket is secured around the animal. This permits the animal to engage in normal behavior but prohibits the animal from escaping the restraining jacket.

Both the shoulder region and the collar extension of the restraining jacket may be secured on the dorsal side of the animal. In a further embodiment, there are two (2) collar extensions that extend in opposite directions and are coupled to each other on the dorsal side of the animal.

The shoulder region and collar extension may be wrapped and secured around the animal so that the inner edges of each are disposed in substantial parallel relation to each other.

The restraining jacket may be partially or fully formed of a hook and loop fastener tape material with one surface including hooked and the opposite surface including loops, so that the restraining jacket can fasten to itself when wrapped and secured around the animal. Alternatively, the restraining jacket may be partially or fully formed of an effectual material to be applied to the surgical/experimental site to determine the effect of the effectual material on the surgical/experimental site.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

Several mouse restraint harnesses are available on the market. These designs are generally a traditional single sock-type with VELCRO® or hook closures and apertures for legs, as seen in FIG. 1. Traditional designs are easy for the animal to remove and are not reliable for long-term protection of surgical sites. Contrastingly, certain embodiments of the current invention comprise a single piece, though divided separate collar regions and shoulder regions. The separation of these regions prevents the subject/animal from working backwards out of the harness/jacket, thus permitting long-term protection of surgical sites. An additional feature is ease of production. In certain embodiments, the current invention is a single material, double sided VELCRO®, with no additional pieces. Current mouse harnesses include at least four (4) different parts assembled with two (2) separate pieces.

Generally, the current invention is an improved rodent jacket intended to protect the shoulder and upper abdomen of the subject (e.g., mouse) from scratching and/or biting. The present invention protects the shoulder and upper abdomen when surgical procedures (sutures, implants, etc.) are performed on such region(s) and must be protected from biting and scratching. The advantage of the current design over existing designs is ability to prevent easy removal by the animal. An additional advantage is the simplified design/manufacture which permits cost-efficient production from a simple, single material (e.g., double-sided VELCRO®).

Structurally, the improved rodent jacket can be formed of a single piece but divides the harness/restraint into separate collar regions and shoulder regions. The separation of these regions makes it difficult for the subject to exit the jacket by working backwards out of the jacket. Tests have proven successful in long-term retention of the jacket, thus permitting long-term protection of surgical sites or appliances, for example on the dorsal shoulder area of the subject.

Figure 2:
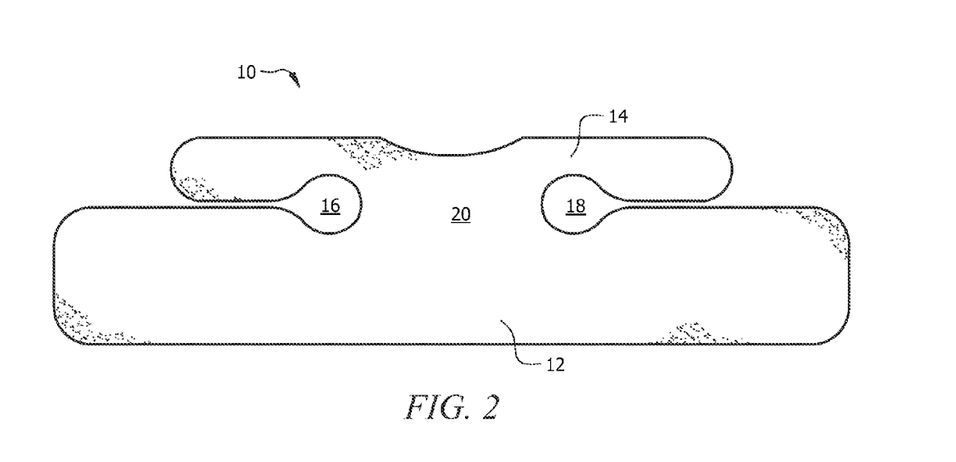
FIG. 2 depicts an animal restraint harness or jacket, according to an embodiment of the current invention.

An embodiment of the novel structure is denoted as a whole in FIG. 2 by the reference numeral 10. Restraint jacket 10 includes first elongated sheet of fabric 12 and second elongated sheet of fabric 14 being disposed in transversely spaced apart, parallel relation to one another by a predetermined distance. Third elongated sheet of fabric 20 is in connecting communication with first elongated sheet of fabric 12 and second elongate sheet of fabric 14, such that restraint jacket 10 can form a single piece of fabric. First elongated sheet 12 extends horizontally a predetermined distance such that it can adequately wrap around a torso of an animal. Second elongated sheet 14 extends horizontally a predetermined distance such that it can wrap around collar regions of an animal. As a result, second elongated fabric 14 extends horizontally to an extent less than first elongated sheet 12.

First aperture 16 and second aperture 18 are centrally formed within restraint jacket 10 but spaced apart for receiving an animal's feet. In a preferred embodiment, first aperture 16 extends towards the outer edges of the fabric, away from second aperture 18, as shown in FIG. 2. In this case, second aperture 18 extends towards the outer edges of the fabric, away from first aperture 18. Thus, apertures 16, 18 are diametrically opposed to one another. Preferably, central apertures 16, 18 should be rounded for receiving an animal's foot and taper off into a line as they extend towards the two ends of first elongated sheet 12 and second elongated sheet 14 forming a channel between first elongated sheet 12 and second elongated sheet 14. In a preferred embodiment, second elongated fabric 14 includes a concave edge along a superior edge of second elongated fabric 14 for engaging a collar region of an animal.

Second elongated sheet 14 should extend vertically at an extent less than first elongated sheet 12 as shown in FIG. 2. In an embodiment, first elongated sheet 12 extends about 19 mm vertically and second elongated sheet 14 extends about 6.5 mm vertically. First aperture 16 and second aperture 18 can have a diameter of about 6 mm.

First elongated sheet 12 has a first side, a second side, an upper side and a bottom side. First side and second side of first elongated sheet 12 are adapted to engage each other for securing restraint jacket 10 around an animal. Any attachment means may be utilizing, for example including, but not limited to, VELCRO®, hooks, or tape. Second elongated sheet 14 includes a first side, a second side, an upper side and a bottom side. First and second side of second elongated strap should also contain an attachment means for securing the device on an animal. In an embodiment, the entire restraint jacket is formed of double-sided VELCRO® to facilitate application onto the animal.

It is foreseeable that restraint jacket 10 contains an elastic strap or elastic fabric to provide additional stretch and prevent chaffing of restraint jacket.

In application, for example on a rodent such as a mouse, first elongated sheet of fabric 12 extends along a dorsal shoulder area of the rodent, attaching along the first side and second side of first elongated sheet 12. Second elongated sheet of fabric 14 extends along a collar region of the rodent, attaching along the first side and second side of second elongated sheet 14. This connection creates two (2) distinct points of contact and connection for securing the rodent. It can be appreciated that restraint apparatus 10 can be applied to any animal.

Example 1

Figure 3A:
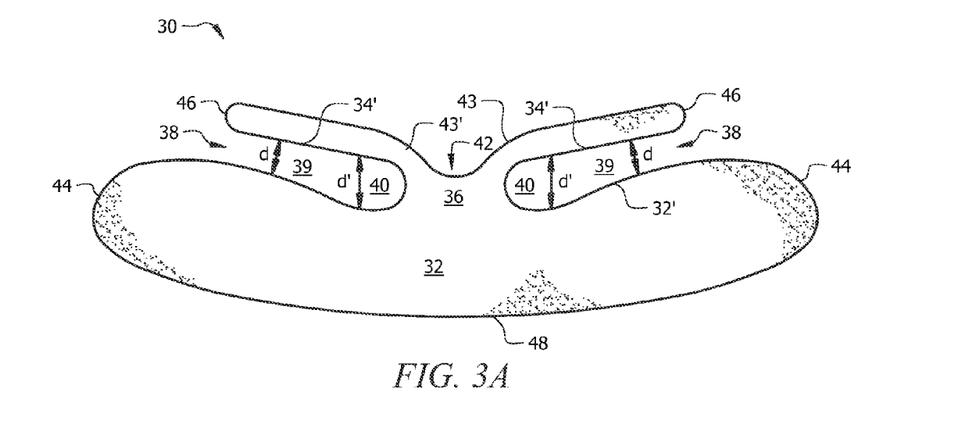
FIG. 3A depicts an animal restraint harness or jacket, according to an embodiment of the current invention.

In an embodiment, seen in FIG. 3A, the current invention is a small animal restraint harness or jacket, generally denoted by the reference numeral 30. Jacket 30 includes, generally, shoulder region 32, collar extensions 34, and connecting segment 36. Connecting segment 36 couples shoulder region 32 with each of collar extensions 34.

Shoulder region 32 and collar extensions 34 are connected 36 in such a manner that cleft 38 is formed between shoulder region 32 and each of collar extensions 34, thus forming two (2) distinct clefts 38. Each of clefts 38 is formed of channel 39 that leads from the environment external to jacket 30, to arm pocket 40. Each of arm pocket 40 is configured to receive each corresponding arm of the subject (e.g., small animal).

As can be seen in FIG. 3A, inner edge 32' of shoulder region 32 and inner edge 34' of collar extension 34 are connected 36 in a manner such that inner edge 32' and inner edge 34' are disposed substantially parallel to each other. FIG. 2 shows corresponding inner edges being directly parallel to each other, but FIG. 3A shows that this relationship between inner edge 32' and inner edge 34' do not have to be directly parallel, though they can be considered to be substantially parallel.

In this way, there can be a distance d formed by cleft 38 between inner ends 32' and 34' distal to arm pocket 40. There can also be a distance d' formed by cleft 38 between inner ends 32' and 34' proximal to arm pocket 40. As can be seen, distance d' can be larger than distance d, yet inner ends 32' and 34' can be considered to be substantially parallel to each other. Distance d' may be larger than distance d in order to provide more space for the arms of the subject, while smaller distance d helps still provide a sufficiently snug and secure fit around the subject's collar region.

Optionally, indented notch 42 can be disposed above and into connecting segment 36 between collar extensions 34 along a superior edge of jacket 30. Notch 42 has a concave edge between collar extensions 34 for engaging the ventral or dorsal portion of the subject's collar. Notch 42 have ends that each lead distally (relative to the central superior-inferior line of axis as depicted in FIG. 3A) to elbow 43, which ultimately leads to or is contiguous with the remainder of collar extension 34. Elbow 43 allows jacket 30 to snugly wrap around the ventral or dorsal portion of the subject's collar.

Shoulder region 32 have two (2) distal ends 44 along the mediolateral axis of shoulder region 32. Collar extensions 34 each have distal end 46. Typically, distal ends 44 and distal ends 46 are rounded for comfort of the subject when distal ends 44 and distal ends 46 contact the skin of the subject. However, this is not required, as can be seen by the ends of first elongated sheet of fabric 12 in FIG. 2, where distal ends 44 and distal ends 46 can be squared or other desired shape.

Shoulder region 32 has an inferior edge 48. Inferior edge 48 typically is rounded to adapt to the rounded contours of the subject's shoulder and torso region. However, as can be seen in FIG. 2, the inferior edge can be flatter as well. The shape and curvature of inferior edge 48 depends on the needs of the subject and user.

In certain embodiments, half of the length along the longitudinal axis of shoulder region 32 is greater than the total length along the longitudinal axis of each collar extension 34. In other words, as seen in FIG. 3, distal ends 44 of shoulder region 32 are further distal to distal end 46 of each collar extension 34, relative to the central superior-inferior line of axis of jacket 30. The reason for this is that typically the subject's collar or neck region has a smaller conference than the subject's shoulder and torso region. As such, it is contemplated that lengths of shoulder region 32 and collar extensions 34 can be any length desired by the user or needed by the subject.

It is envisioned that jacket 30 is symmetrical about a central vertical lines of axis that would run from about the center of notch 42 to about the center of inferior edge 48 of shoulder region 32. The term "vertical" is used herein relative to the depiction of restraint 30 in FIG. 3A. However, this symmetrical nature of jacket 30 is optional, as certain embodiments of the current invention can be asymmetrical according to the needs of the subject.

Figure 3B:
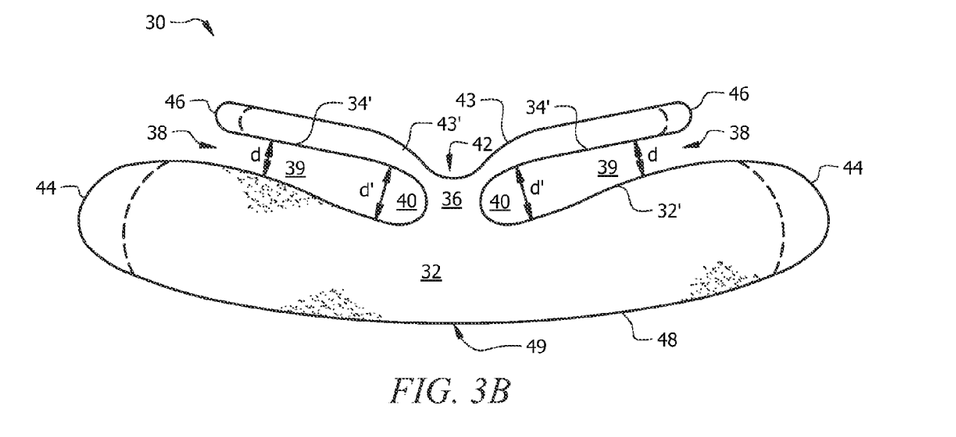
FIG. 3B depicts an animal restraint harness or jacket, according to an embodiment of the current invention.

FIG. 3B shows an embodiment of the current invention similar to jacket 30 seen in FIG. 3A but with a few variations. Jacket 30 has been utilized on both small mice (~30 grams) and large mice (~45 grams) with equal effectiveness. The circumference of the neck and abdomen on smaller animals are smaller than those on larger animal. To prevent shoulder region 32 and collar extensions 34 from double on around smaller animals, distal ends 44 of shoulder region 32 and distal ends 46 of collar extensions 34 can be trimmed (e.g., using scissors) along the broken lines seen in FIG. 3B. Thus, whereas conventional animal harnesses or jackets are different sizes, jacket 30 can be a single size that can be trimmed down depending on the size of the animal.

Another aspect of FIG. 3B is an additional indented notch, generally denoted by the reference numeral 49, that may be disposed below and into shoulder region 32 along the center of an inferior edge of jacket 30. Notch 49 has a shallow concave edge for engaging the ventral or dorsal portion of the subject's abdomen.

Connecting segment 36 in FIG. 3B also is thinner than that seen in FIG. 3A.

Example 2

Figure 4:
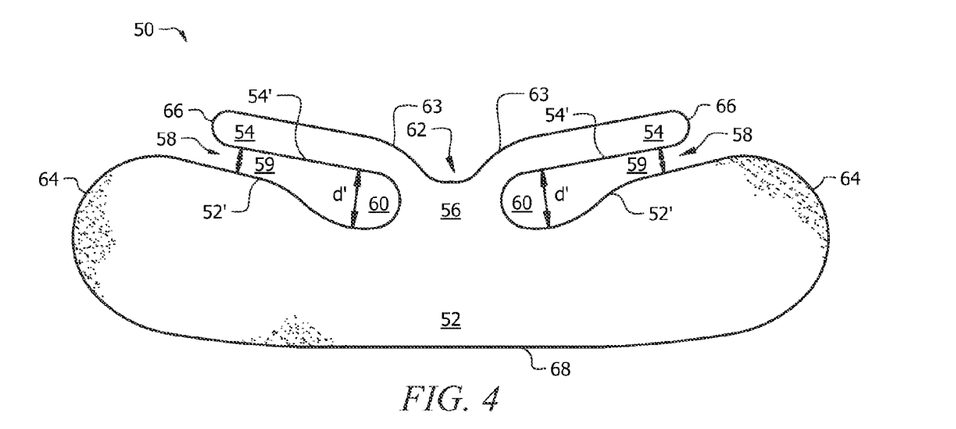
FIG. 4 depicts an animal restraint harness or jacket, according to an embodiment of the current invention.

In an embodiment, seen in FIG. 4, the current invention is a small animal restraint harness or jacket, generally denoted by the reference numeral 50. Jacket 50 includes, generally, shoulder region 52, collar extensions 54, and connecting segment 56. Connecting segment 56 couples shoulder region 52 with each of collar extensions 54.

Shoulder region 52 and collar extensions 54 are connected 56 in such a manner that cleft 58 is formed between shoulder region 52 and each of collar extensions 54, thus forming two (2) distinct clefts 58. Each of clefts 58 is formed of channel 59 that leads from the environment external to jacket 50, to arm pocket 60. Each of arm pocket 60 is configured to receive each corresponding arm of the subject (e.g., small animal). The thickness of collar extensions 54 depend on the needs of the subject and user. For example, collar extensions 34 seen in FIG. 3 are a bit thinner than collar extensions 54 seen in FIG. 4. A thicker collar region or greater security may require thicker collar extensions.

Further referring to FIG. 4, inner edge 52' of shoulder region 52 and inner edge 54' of collar extension 54 are connected 56 in a manner such that inner edge 52' and inner edge 54' are disposed substantially parallel to each other. FIG. 2 shows corresponding inner edges being directly parallel to each other, but FIG. 4 shows that this relationship between inner edge 52' and inner edge 54' do not have to be directly parallel, though they can be considered to be substantially parallel.

In this way, there can be a distance d formed by cleft 58 between inner ends 52' and 54' distal to arm pocket 60. There can also be a distance d' formed by cleft 58 between inner ends 52' and 54' proximal to arm pocket 60. As can be seen, distance d' can be larger than distance d, yet inner ends 52' and 54' can be considered to be substantially parallel to each other. Distance d' may be larger than distance d in order to provide more space for the arms of the subject, while smaller distance d helps still provide a sufficiently snug and secure fit around the subject's collar region. As can be seen between FIGS. 3 and 4, the value of distance d and distance d' can vary. For example, distance d is smaller in FIG. 4 than in FIG. 3, whereas distance d' is larger in FIG. 4 than in FIG. 3. This provides more defined arm pockets 60 that a subject may require.

Optionally, indented notch 62 can be disposed above and into connecting segment 56 between collar extensions 54 along a superior edge of jacket 50. Notch 62 has a concave edge between collar extensions 54 for engaging the ventral or dorsal portion of the subject's collar. Notch 62 have ends that each lead distally (relative to the vertical superior-inferior axis as depicted n FIG. 3) to elbow 63, which ultimately leads to or is contiguous with the remainder of collar extension 54. Elbow 63 allows jacket 50 to snugly wrap around the ventral or dorsal portion of the subject's collar.

Shoulder region 52 have two (2) distal ends 64 along the mediolateral axis of shoulder region 52. Collar extensions 54 each have distal end 66. Typically, distal ends 64 and distal ends 66 are rounded for comfort of the subject when distal ends 64 and distal ends 66 contact the skin of the subject. However, this is not required, as can be seen by the ends of first elongated sheet of fabric 12 in FIG. 2, where distal ends 64 and distal ends 66 can be squared or other desired shape. When comparing FIGS. 3 and 4, it can be seen that distal ends 64 of shoulder region 52 are thicker in FIG. 4 than distal ends 44 of shoulder region 32 in FIG. 3. The thickness may be more beneficial for different types of subjects.

Shoulder region 52 has inferior edge 68. Inferior edge 68 typically is rounded to adapt to the rounded contours of the subject's shoulder and torso region. However, as can be seen in FIG. 2, the inferior edge can be flatter as well. The shape and curvature of inferior edge 68 depends on the needs of the subject and user.

In certain embodiments, half of the length along the longitudinal axis of shoulder region 52 is greater than the total length along the longitudinal axis of each collar extension 54. In other words, as seen in FIG. 4, distal ends 64 of shoulder region 52 are further distal to distal end 66 of each collar extension 54. relative to the central superior-inferior axis of jacket 50. The reason for this is that typically the subject's collar or neck region has a smaller conference than the subject's shoulder and torso region. As such, it is contemplated that lengths of shoulder region 52 and collar extensions 54 can be any length desired by the user or needed by the subject.

It is envisioned that jacket 50 is symmetrical about a central vertical lines of axis that would run from about the center of notch 62 to about the center of inferior edge 68 of shoulder region 52. The term "vertical" is used herein relative to the depiction of restraint 50 in FIG. 4. However, this symmetrical nature of jacket 50 is optional, as certain embodiments of the current invention can be asymmetrical according to the needs of the subject.

Example 3

FIGS. 5A-5F depict the methodology of applying a small animal restraining harness or jacket, according to an embodiment of the current invention, where the jacket is generally denoted by the references numerals 10, 30, 50, referring to FIGS. 2-4, previously described. In these figures, jacket 10, 30, 50 is applied to a rodent such as a mouse, generally denoted by the reference numeral 70, by a laboratory technician or other user, generally denoted by the reference numeral 80. It should be understood that although rodent 70 is seen here, any suitable animal or subject can be utilized with jacket 10, 30, 50.

Jacket 10, 30, 50 can be formed of any suitable material, but in an embodiment includes (1) an outer "hook" side formed of a firmer or harder material, and (2) an inner "loop" side formed of a softer or more flexible material. The "loop" side is intended to contact the body of rodent 70, whereas the "hook" side would face the exterior. When the distal ends of the shoulder region are fastened together and the distal ends of the collar extensions are fastened together, jacket 10, 30, 50 can be rolled between the hands of user 80 to make jacket 10, 30, 50 more flexible.

Figure 5A:
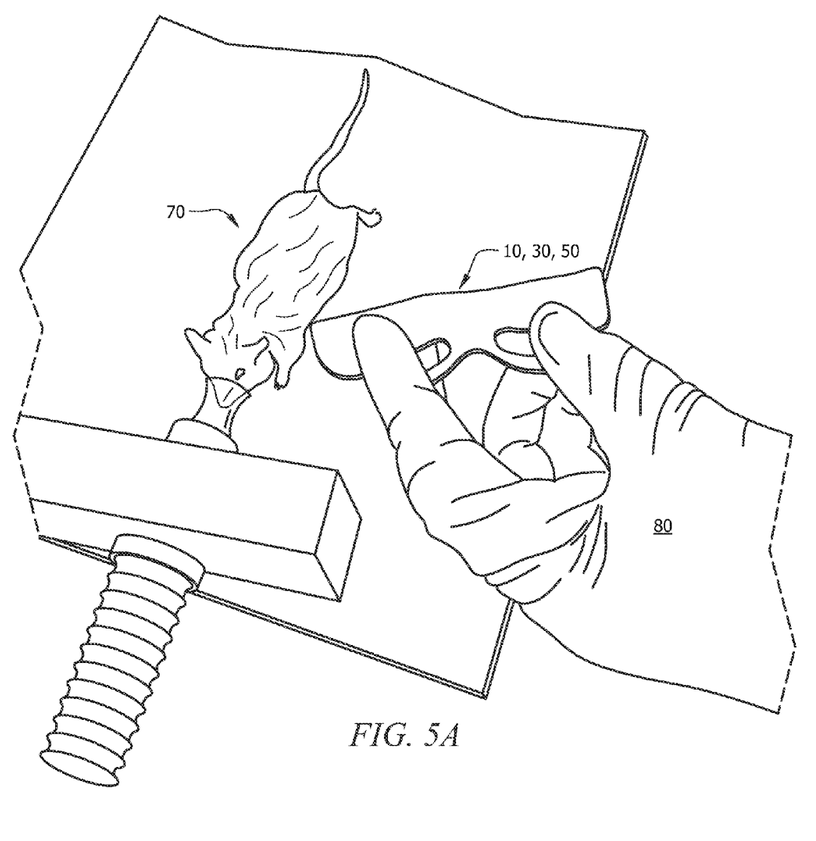
FIGS. 5A-5F depict a procedure of applying an animal restraint harness or jacket to a rodent, according to an embodiment of the current invention.
Figure 5B:
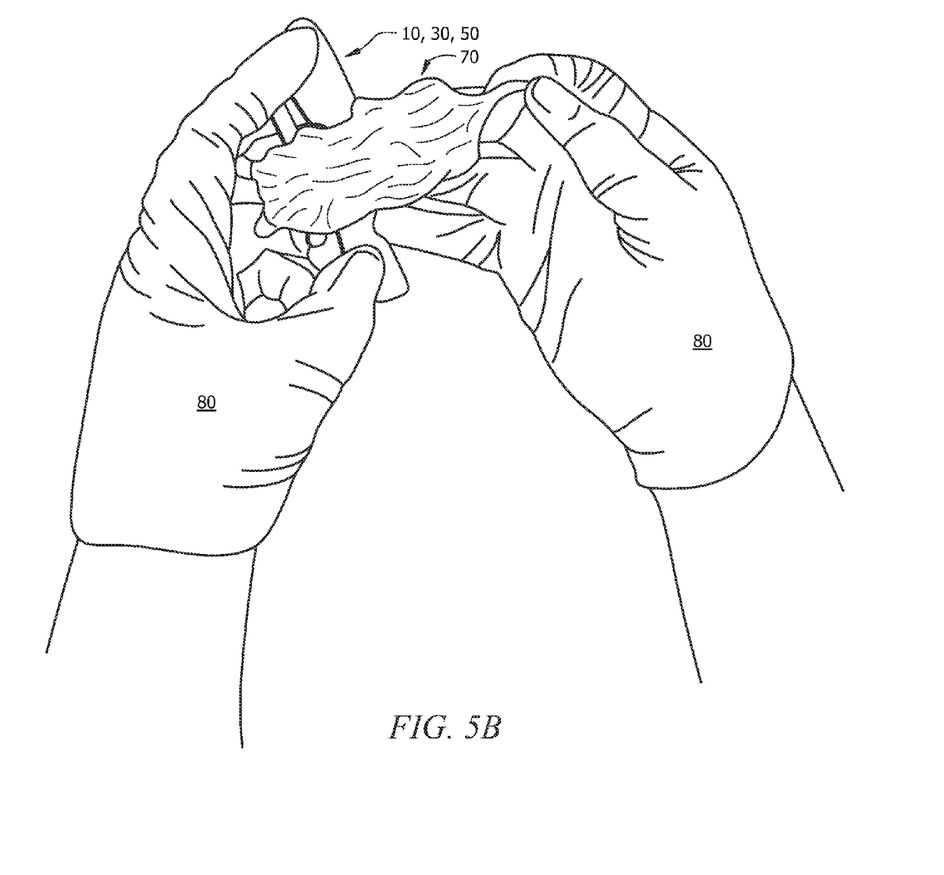
Figure 5C:
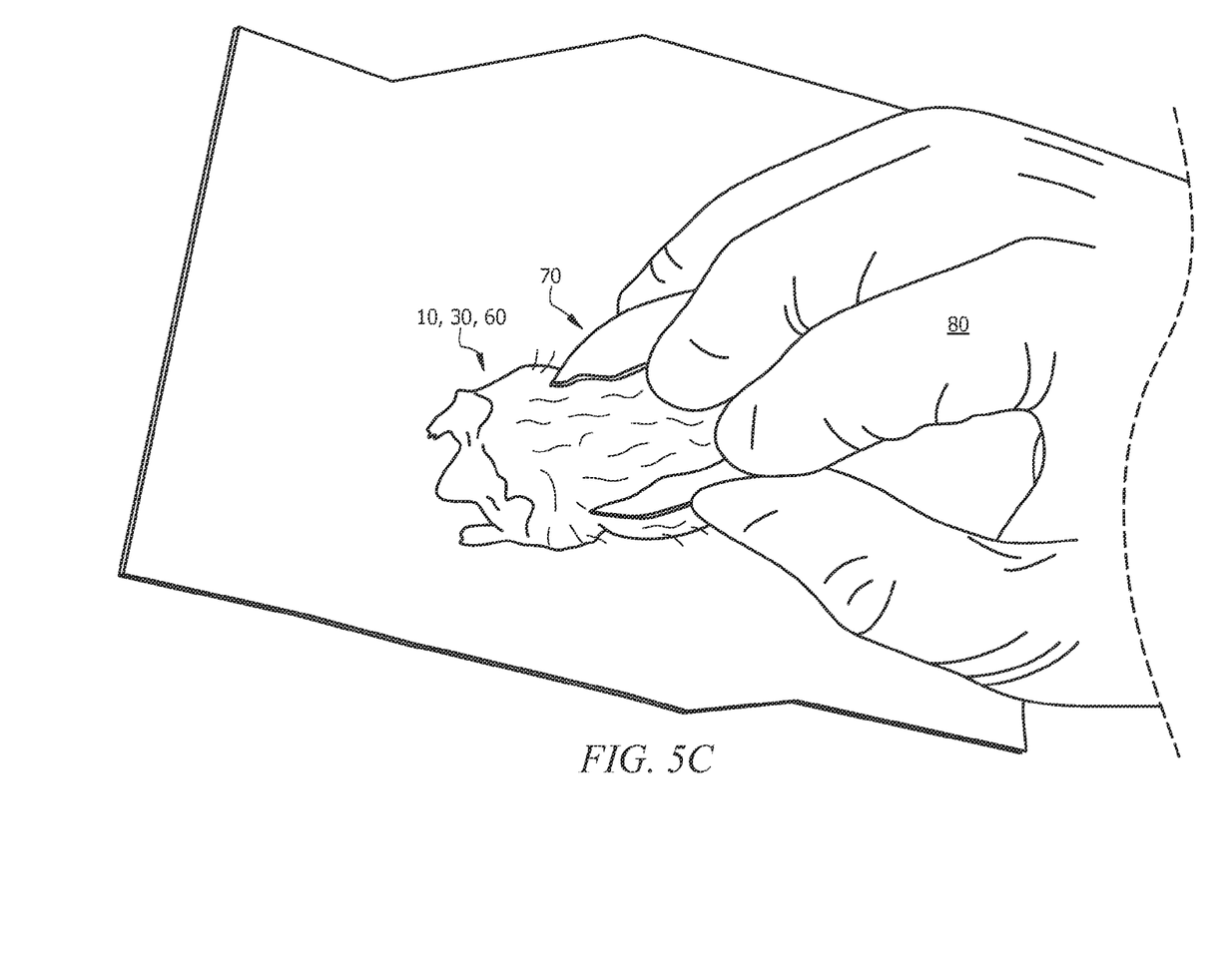

Jacket 10, 30, 50 is unfastened/opened with the "loop" side facing up (FIG. 5A). Upon being sedated (e.g., isoflurane), rodent 70 is positioned on top of jacket 10, 30, 50, where the ventral side of rodent 70 contacts the top or "loop" side of jacket 10, 30, 50 (FIG. 5B). The forelegs of rodent 70 are placed in the apertures or arm pockets created within each cleft between the shoulder region and the collar extension (FIG. 5B).

The shoulder region of jacket 10, 30, 50 are held up as a harness for rodent 70 (FIG. 5C), so that the body of rodent 70 can be positioned appropriately (i.e., forelegs of rodent 70 are in the correct position, mouth and neck of rodent 70 are in front of the collar extensions).

Figure 5D:
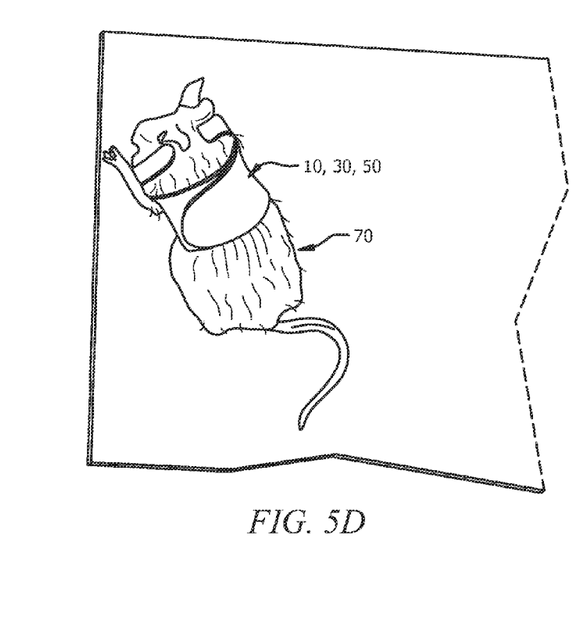
Figure 5E:
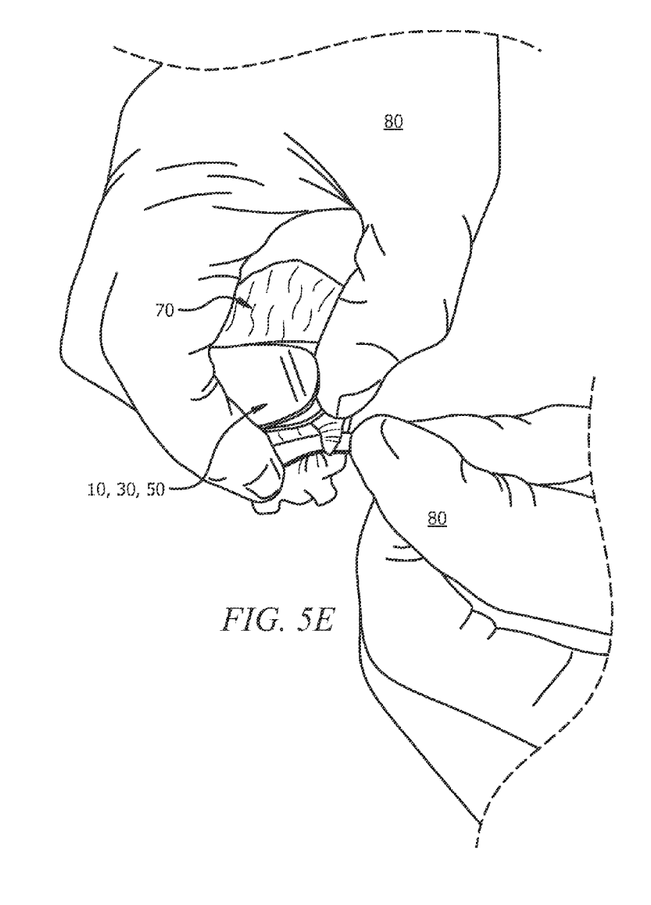

The distal ends of the shoulder region are then fastened together on the dorsal side of rodent 70 (FIG. 5D). The fastened ends should be reasonably snug. The main purpose of the shoulder region of jacket 10, 30, 50 is to protect the upper thorax and dorsal shoulder area of rodent 70.

The collar extensions of jacket 10, 30, 50 are then positioned around the neck of rodent 70 (having ensured that the forelegs are inserted into the arm pockets properly and the mouth is clear of jacket 10, 30, 50). The collar extensions are fastened (FIG. 5E), such that the collar extensions should be appropriately snug around the collar or neck area of rodent 70. The appropriate tightness ensures that the collar extensions are not so loose that rodent 70 can escape jacket 10, 30, 50 and not so tight that rodent 70 experiences edema.

The distal ends of the shoulder region and collar extensions can be fastened respectively by any mechanisms known in the art. Examples include, but are not limited to, VELCRO®, hooks, tapes, etc.

Figure 5F:
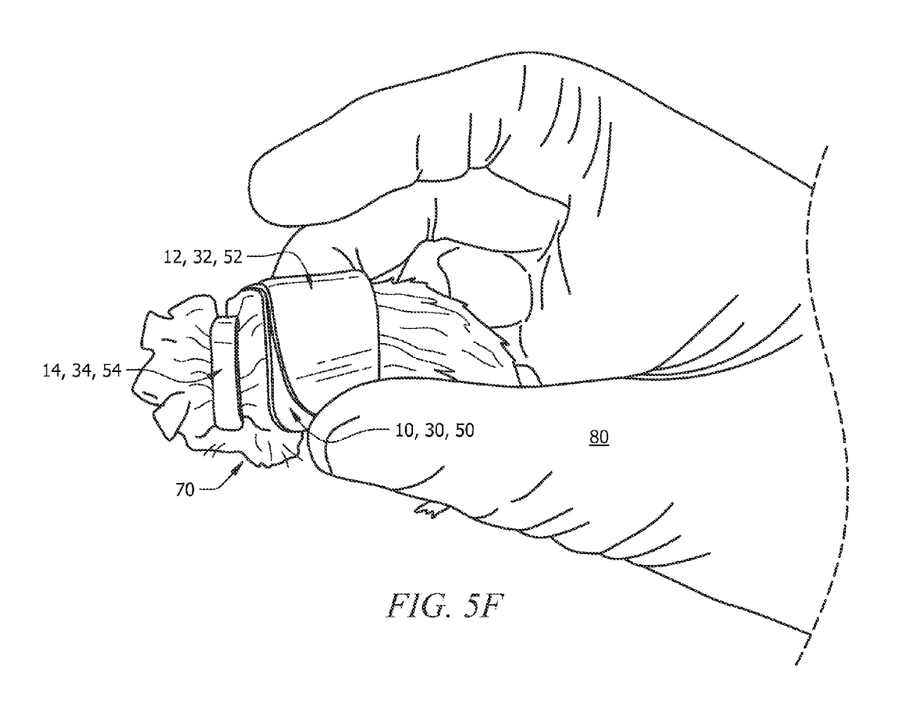

Rodent 70 with jacket 10, 30, 50 fully applied can be seen in FIG. 5F. At this point, it can be ensured that the forelegs of rodent 70 are fully extended through the arm pockets of jacket 10, 30, 50 and that the mouth and neck of rodent 70 are clear of jacket 10, 30, 50. Rodent 70 can then be returned to its experimental environment and be observed. Rodent 70 should be able to engage in all normal behavior (e.g., walking, climbing, grooming, etc. with no restriction).

Materials and Methodology

Jacket 10, 30, 50 can be formed or fabricated of any material suitable for experimental procedures on rodent 70. In an embodiment, the material is partially or fully formed of hook and loop fastener tape (e.g., VELCRO) with one surface including hooks and the opposite surface including loops, so that when jacket 10, 30, 50 wraps around itself, it would naturally stick to itself and be secured around rodent 70 in the manner seen in FIGS. 5A-5F.

In application of certain embodiments of the current invention, jacket 10, 30, 50 is used to protect a site of surgery (not shown) on rodent 70. This is done because rodent 70 tends to bite and scratch that site of surgery during the experimental procedure. Damage to the surgical site due to scratching and biting may alter the results of the experimental procedure. During certain experimental procedures, that site of surgery would be positioned below shoulder region 12, 32, 52 (see FIG. 5F), such that shoulder region 12, 32, 52 provides a physical barrier on the dorsal side (i.e., back) of rodent 70 where the surgical site is to be protected in order to preserve the results of the ongoing experiment.

In certain embodiments, if experimental procedure calls for the surgical site to be healed or for a particular substance to be administered to the surgical site, the appropriate portion or surface of jacket 10, 30, 50 can include the appropriate drug or other substance (e.g., antibacterial) to be delivered to the surgical site. Thus, for example, if the surgical site is positioned below shoulder region 12, 32, 52 (see FIG. 5F), then the contact surface of shoulder region 12, 32, 52 (i.e., the surface of the shoulder region that contacts the rodent) can include the appropriate substance. If the surgical site is to be healed, then jacket 10, 30, 50 can serve as a bandage, for example for antibacterial purposes. If another substance is to be delivered to the surgical site, then jacket 10, 30, 50 can further the experimental purpose, for example to see how the surgical site responds to the particular substance. As another example, jacket 10, 30, 50—or a portion thereof—can be formed of an absorbent material, so that not only is the wound/surgical site protected, but any fluid from the wound itself can be absorbed.

In certain embodiments, the anatomical configuration of jacket 10, 30, 50 (shown in FIGS. 5A-5F) can be critical to the harnessing and protection of rodent 70. Generally, it is well-known that rodents are uniquely adept at escaping harnesses and maneuvering in very tight spaces, particularly when under stress. For that reason, the current invention was fabricated and configured on the rodent's body so that jacket 10, 30, 50 is inescapable for rodent 70.

Different configurations of the jacket/harness would be insufficient for protecting rodent 70 and for preventing rodent 70 from escaping the jacket/harness. For example, conventional animal harnesses—such as those taught in U.S. Pat. No. 6,443,101 and in U.S. Patent Application Publication No. 2003/0177984—fasten in the opposite configuration, specifically on the ventral side of the animal along the abdomen and throat area. These harnesses may not be easily escaped by larger animals, such as dogs, but smaller animals, such as mice, can easily escape such harnesses. In fact, the current inventors attempted such a configuration of jacket 10, 30, 50, but it was found that that such configuration actually led to rodent 70 escaping from jacket 10, 30, 50, thus exposing the surgical/experimental site to biting, scratching, and other external, unwanted variables. Ultimately, what works on certain animals, such as dogs, would not be suitable for rodents, as their behavioral differences render the harnesses/jackets needed very different from each other.

To provide the benefits desired, particularly protection and inescapability, for certain embodiments of the current invention, jacket 10, 30, 50 should be positioned and secured around rodent 70 as previously described in this specification. This methodology was found to be most effective and at times, critical to the utility of the current invention. As can be best seen in FIG. 5F, a gap is formed between shoulder region 12, 32, 34 and collar extension 14, 34, 54. This gap will be termed a "dorsal gap", as the gap is to be positioned on the dorsal/back side of rodent 70. Having jacket 10, 30, 50 secured around rodent 70 in this manner—with shoulder region 12, 32, 52 secured to itself on the dorsal side of rodent 70; with collar extension 14, 34, 54 secured to itself on the dorsal side of rodent 70; and with the dorsal gap positioned on the dorsal side of rodent 70—facilitates the benefits described herein, specifically protection and inescapability. If jacket 10, 30, 50 was positioned and secured around rodent 70 with the opposite configuration (i.e., with shoulder region 12, 32, 52 secured to itself on the ventral side of rodent 70; with collar extension 14, 34, 54 secured to itself on the ventral side of rodent 70; and with the gap therebetween positioned on the ventral side of rodent 70), as was tested by the current inventors, then rodent 70 would be more prone to escaping jacket 10, 30, 50 when under any sort of stress, since the appendages of rodent 70 may be able to squirm through shoulder region 12, 32, 52 and collar extension 14, 34, 54 at the point of attachment.

Testing

Various structures and methodologies according to certain embodiments of the current invention were tested for efficacy in the course of studying dermal wound healing in mice. During these studies, it was necessary to create excisional wounds on back/dorsal side of the mice. These surgical wounds included silicone splints (i.e., washers) sutured to the periphery of the wound. The wounds took ~24 days to heal and it was critical during this time that the sutures remained intact and not be chewed, scratched, or otherwise manipulated by the mouse. The issue of requiring the sutures to remain untouched necessitated a protective jacket to cover the wounds and protect the sutures; it also required that the mice not be able to escape the jacket (otherwise, they would have access to the sutures).

All possible commercial mouse jackets that could be identified were evaluated, including different configurations of jackets. Without exception, mice could escape the jacket within about one (1) hour. One design tested was the collar extension and shoulder region closed on the ventral side of the mouse (and thus had a solid connection between collar and body along the dorsal side of the mouse). The mouse was able to escape this type of jacket also, typically within about one (1) hour. In studying how they managed to do this, it became apparent that they would back out of such jackets—often by wedging against the opening of their plastic house or bar of the cage.

In observing such escape, it became apparent that the dorsal gap was critical (i.e., dorsal flap closure, not ventral) to certain embodiments of the current invention. When the dorsal gap is present, when the mouse attempted to back out by wedging the shoulder region against a bar or opening, the force is not transmitted to the collar (due to the gap). In other words, the dorsal gap prevented such leverage from being transmitted to the collar and thus, the mouse was unable push the collar over its head and back out and escape. Embodiments of the current invention having and using this dorsal gap design are essentially escape-proof with <10% escape statistics over ~150 animals and 24 days each animal.

Glossary of Claim Terms

Animal: This term is used herein to refer to any living or non-living being that requires use of a restraining harness or jacket for experimental or non-experimental use. Typically, the term "animal" refers to smaller animals, such as mice.

Central area: This term is used herein to refer to a section of the restraining harness or jacket on or around the central line of axis of the jacket.

Central superior-inferior line of axis: This term is used herein to refer to an imaginary line down the center of the restraining harness or jacket in a direction from the head of the animal toward the rear of the animal.

Channel gap: This term is used herein to refer to a distance between the inner ends of the shoulder region and collar extension along the channel of the cleft.

Channel: This term is used herein to refer to a pathway between two (2) components (e.g., shoulder region and collar extension) making up the body of a cleft.

Cleft: This term is used herein to refer to a division of open space between two (2) components, where one end is open and the opposite side is closed, similar to that seen in FIGS. 1-3.

Dorsal gap: This term is used herein to refer to an opening between structures on certain embodiments of the current invention, where the opening is positioned on the dorsal/back side of the animal. For example, it is the space between the shoulder region and collar extensions on the jacket/harness when properly positioned and secured around the rodent.

Effectual material: This term is used herein to refer to any substance desired to be tested on a surgical/experimental site on the test subject. This substance is intended to produce an effect on the site or no effect at all, depending on the underlying experimental conditions and purposes.

External environment: This term is used herein to refer to any location outside of the spatial confines of the restraining harness or jacket. Thus, if the channel of the cleft opens to the external environment of the jacket, then the channel is in open communication with the external environment lateral to the channel in a direction distal to the forelimb pocket.

Forelimb pocket gap: This term is used herein to refer to a distance between the inner ends of the shoulder region and collar extension within the forelimb pocket of the cleft.

Forelimb pocket: This term is used herein to refer to a receptacle or compartment configured to receive a forelimb of an animal therethrough, typically at the closed end of the cleft.

Harness: This term is used herein to refer to restraining or supporting an animal, such as a rodent, without allowing said animal from escaping such restraint.

Indented notch: This term is used herein to refer to a rounded cut or indentation within an edge of the restraining harness or jacket, where the indented notch conforms to the ventral neck area of the animal.

Lateral edge: This term is used herein to refer to the terminating ends of the shoulder region (e.g., 44 and 64 in FIGS. 2 and 3, respectively) and collar extension (e.g., 46 and 66 in FIGS. 2 and 3, respectively).

Normal behavior: This term is used herein to refer to tendencies or conduct of an animal with or without stress on a day-to-day basis. These tendencies include, but are not limited to, walking around, climbing, sleeping, eating, drinking, etc. These tendencies differ based on the animal and would be known via simple observation of that animal.

Protect: This term is used herein to refer to preventing any unwanted contact on an experimental subject (e.g., rodent), or a particular surface on the subject.

Restraining harness or jacket: This term is used herein to refer to an apparatus that is protecting the neck, torso, abdominal, and/or back areas of an animal when surgical procedures are performed and/or when the regions must be protected from biting and scratching.

Shoulder region: This term is used herein to refer to a component of a restraining harness or jacket that is intended to cover or protect a particular anatomical area of an animal, for example including, but not limited to, chest, upper abdomen, torso, upper back area, and shoulders of an animal.

Site of surgery: This term is used herein to refer to the location on the exterior of a subject's body where an experimental procedure is taking place or has taken place.

Substantial parallel relation: This term is used herein to refer to the direction of an edge of two (2) components being substantially the same relative to each other. There may be slight differences in the direction (i.e., differences between the channel gap and the forelimb pocket gap) but still be considered to be substantially parallel.

Symmetrical: This term is used herein to refer to a characteristic of the restraining harness or jacket to have similar or proportional components (including type, size, etc.) on each side of the central superior-inferior line of axis.

Thicker: This term is used herein to refer to the dimension of length across the shoulder region of the restraining harness or jacket in a direction orthogonal to the longitudinal axis of the shoulder region.

Transversely across shoulder region: This term is used herein to refer to a direction from the head of the animal toward the rear of the animal.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A method of harnessing or protecting a small animal during an experimental procedure on said small animal, comprising:

providing a restraining jacket, said restraining jacket including a shoulder region configured to wrap around a shoulder or torso area of said animal, and at least one elongate collar extension coupled to said shoulder region, said at least one collar extension configured to wrap or be secured around a collar or neck area of said animal;

positioning said restraining jacket in an open position on a ventral side of said animal;

wrapping said shoulder region of said restraining jacket around said shoulder or torso area of said animal;

securing said shoulder region of said restraining jacket around said shoulder or torso area of said animal;

wrapping said at least one collar extension of said restraining jacket around said collar or neck area of said animal;

securing said at least one collar extension of said restraining jacket around said collar or neck area of said animal, wherein an open dorsal gap is formed between said shoulder region and said at least one collar extension on a dorsal side of said animal when said restraining jacket is secured around said animal, such that said animal engages in normal behavior but is prohibited from escaping from said restraining jacket.

2. A method as in claim 1, wherein said small animal is a rodent.

3. A method as in claim 1, further comprising:
said shoulder region of said restraining jacket being secured on said dorsal side of said animal; and
said at least one collar extension being secured on said dorsal side of said animal.

4. A method as in claim 3, further comprising:
said at least one collar extension including a first collar extension and a second collar extension, said first and second collar extensions each having an end, wherein said end of said first collar extension and said end of said second collar extension are configured to be coupled to one another on said dorsal side of said animal.

5. A method as in claim 4, further comprising:
said first collar extension and said second collar extension being symmetrical about a central superior-inferior line of axis disposed transversely across said shoulder region.

6. A method as in claim 1, further comprising:
securing said shoulder region and said at least one collar extension so that an inner edge of said shoulder region is disposed in substantial parallel relation to an inner edge of said at least one elongate collar extension.

7. A method as in claim 1, further comprising:
said at least one collar extension further including an elbow for snugly wrapping around said collar or neck area of said animal.

8. A method as in claim 1, wherein:
a cleft is formed between said shoulder region and said at least one collar extension coupled thereto, said cleft having a channel leading to a forelimb pocket having a position that corresponds to a forelimb of said animal.

9. A method as in claim 8, wherein:
a channel gap is formed in said channel of said cleft between said shoulder region and said at least one collar extension, such that said channel of said cleft opens to an environment external and lateral to said restraining harness or jacket.

10. A method as in claim 9, wherein:
a forelimb pocket gap is formed in said forelimb pocket between said shoulder region and said at least one collar extension.

11. A method as in claim 1, wherein:
an indented notch formed in a superior edge of said restraining harness or jacket, said indented notch disposed adjacent to said at least one collar extension and configured to conform to a ventral throat area of said animal.

12. A method as in claim 1, wherein:
said restraining jacket is partially or fully formed of a hook and loop fastener tape material with one surface including hooks and an opposite surface including loops, so that said restraining jacket couples to itself when wrapped and secured around said animal.

13. A method of protecting a site of surgery on a small animal during an experimental procedure on said small animal, comprising:
providing a restraining jacket, said restraining jacket including a shoulder region configured to wrap around a shoulder or torso area of said animal, and at least one elongate collar extension coupled to said shoulder region, said at least one collar extension configured to wrap or be secured around a collar or neck area of said animal;

positioning said restraining jacket in an open position on a ventral side of said animal;

wrapping said shoulder region of said restraining jacket around said shoulder or torso area of said animal;

securing said shoulder region of said restraining jacket around said shoulder or torso area of said animal so that said shoulder region covers and is disposed over top of said site of surgery to prevent unwanted contact to said site of surgery;

wrapping said at least one collar extension of said restraining jacket around said collar or neck area of said animal;

securing said at least one collar extension of said restraining jacket around said collar or neck area of said animal, wherein an open dorsal gap is formed between said shoulder region and said at least one collar extension on a dorsal side of said animal when said restraining jacket is secured around said animal, such that said animal engages in normal behavior but is prohibited from escaping from said restraining jacket.

14. A method as in claim 13, wherein said small animal is a rodent.

15. A method as in claim 13, further comprising:
said shoulder region of said restraining jacket being secured on said dorsal side of said animal; and
said at least one collar extension being secured on said dorsal side of said animal.

16. A method as in claim 15, further comprising:
said at least one collar extension including a first collar extension and a second collar extension, said first and second collar extensions each having an end, wherein said end of said first collar extension and said end of said second collar extension are configured to be coupled to one another on said dorsal side of said animal.

17. A method as in claim 16, further comprising:
said first collar extension and said second collar extension being symmetrical about a central superior-inferior line of axis disposed transversely across said shoulder region.

18. A method as in claim 13, further comprising:
securing said shoulder region and said at least one collar extension so that an inner edge of said shoulder region is disposed in substantial parallel relation to an inner edge of said at least one elongate collar extension.

19. A method as in claim 13, wherein:
said restraining jacket is partially or fully formed of a hook and loop fastener tape material with one surface including hooks and an opposite surface including loops, so that said restraining jacket couples to itself when wrapped and secured around said animal.

20. A method as in claim 13, wherein:
said restraining jacket is partially or fully formed of an effectual material to be applied to said site of surgery to determine the effect of said effectual material on said site of surgery.

* * * * *